(12) United States Patent
Blanc et al.

(10) Patent No.: US 10,578,147 B2
(45) Date of Patent: Mar. 3, 2020

(54) THREAD FOR AN AIR-DRYER CARTRIDGE

(71) Applicant: VOLVO TRUCK CORPORATION, Göteborg (SE)

(72) Inventors: Xavier Blanc, Chassieu (FR); Gautier Kaps, Distroff (FR)

(73) Assignee: VOLVO TRUCK CORPORATION, Göteborg (SE)

( * ) Notice: Subject to any disclaimer, the term of this patent is extended or adjusted under 35 U.S.C. 154(b) by 176 days.

(21) Appl. No.: 15/578,752

(22) PCT Filed: Jun. 2, 2015

(86) PCT No.: PCT/IB2015/001723
§ 371 (c)(1),
(2) Date: Dec. 1, 2017

(87) PCT Pub. No.: WO2016/193775
PCT Pub. Date: Dec. 8, 2016

(65) Prior Publication Data
US 2018/0216655 A1   Aug. 2, 2018

(51) Int. Cl.
*F16B 39/30* (2006.01)
*B01D 46/24* (2006.01)
*B01D 53/26* (2006.01)
*B01D 53/04* (2006.01)

(52) U.S. Cl.
CPC .......... *F16B 39/30* (2013.01); *B01D 46/2411* (2013.01); *B01D 53/26* (2013.01); *B01D 53/0415* (2013.01); *B01D 53/261* (2013.01); *B01D 2259/4566* (2013.01); *B01D 2265/029* (2013.01)

(58) Field of Classification Search
CPC .... F16B 25/00; F16B 25/0047; F16B 33/002; F16B 33/02; F16B 39/00; F16B 39/30; B01D 46/2411; B01D 2265/029
USPC .......................... 411/366.1, 366.3, 411, 423
See application file for complete search history.

(56) References Cited

U.S. PATENT DOCUMENTS

| | | | | |
|---|---|---|---|---|
| 2,206,223 A | * | 7/1940 | Dearborn | F16B 5/00 403/335 |
| 3,640,416 A | | 2/1972 | Temple | |
| 3,660,233 A | * | 5/1972 | Dalke | G21C 5/06 376/438 |
| 4,076,064 A | * | 2/1978 | Holmes | F16B 33/02 411/285 |
| 4,307,816 A | * | 12/1981 | Manasas | F16B 33/02 138/89 |
| 4,432,682 A | * | 2/1984 | McKewan | F16B 33/02 411/311 |

(Continued)

FOREIGN PATENT DOCUMENTS

EP   0150657 A2   9/1985
WO   0027297 A1   5/2000

OTHER PUBLICATIONS

International Search Report (dated Feb. 19, 2016) for corresponding International App. PCT/IB2015/001723.

*Primary Examiner* — Roberta S Delisle
(74) *Attorney, Agent, or Firm* — Withrow & Terranova, PLLC

(57) ABSTRACT

A thread connection is provided between a filter cartridge and its base, as well as to a filter cartridge comprising such a thread. The thread has a reversed load flank.

16 Claims, 2 Drawing Sheets

(56) References Cited

U.S. PATENT DOCUMENTS

| | | | | |
|---|---|---|---|---|
| 4,549,754 | A | * | 10/1985 | Saunders .............. E21B 17/042 285/334 |
| 5,643,269 | A | * | 7/1997 | Harle ................. A61B 17/1655 606/312 |
| 6,394,726 | B1 | * | 5/2002 | Garvick .............. F16B 25/0047 411/411 |
| 6,672,813 | B1 | * | 1/2004 | Kajita ................. F16B 25/0031 411/387.4 |
| 7,997,842 | B2 | | 8/2011 | Dickmeyer |
| 8,882,425 | B2 | * | 11/2014 | Benjamin ............... F16B 33/02 411/116 |
| 9,175,711 | B2 | * | 11/2015 | Benjamin ............... F16B 33/02 |
| 2006/0186036 | A1 | | 8/2006 | South et al. |
| 2011/0146298 | A1 | * | 6/2011 | Reinhardt .............. F01D 5/066 60/796 |

* cited by examiner

THREAD FOR AN AIR-DRYER CARTRIDGE

BACKGROUND AND SUMMARY

This invention is directed to a thread connection in general, and in particular to the thread of a filter cartridge, and to the filter cartridge comprising such a thread. More particularly, the thread has a reversed load flank, which allows to prevent ripping out of the cartridge from its base.

Vehicles equipped with a combustion engine, comprise several filters that have to be changed during the maintenance operations. Theses filters are usually disposable cartridges, which are directly fixed to the engine through a base, or placed in a bowl or a housing, which is fixed to the engine. In most cases, the cartridge or the bowl is threaded in such a way that it can be screwed on the base. Threaded connections are usually formed using metric ISO standard thread. Some specific shape may also be used like in U.S. Pat. No. 7,997,842. Those conventional thread connections allow the manual tightening of the cartridge or the bowl containing the filter. However, those threads are not adapted for resisting high ripping out forces, In case of prolonged internal pressure, or overpressure, or in case the cartridge is not properly tightened, then the cartridge can be ripped out. Therefore, it is desirable to prevent accidental rip out of the cartridge while maintaining the easiness of the manual tightening. This is particularly true for an air-dryer filter cartridge for compressed air systems of a truck.

It is therefore desirable to secure the cartridge or the bowl containing the cartridge on the base.

An air-drier cartridge of brake system of a truck is particularly exposed to high puts ting pressures. The pulsating pressure is transmitted to the threads. These repeated constraints can induce tiredness of the thread connection, and thus initiate a dissociation of the air-drier cartridge from its base. This can limit the time of use of a cartridge or the bowl containing the cartridge.

It is therefore desirable to allow a prolonged usage of the cartridge or the bowl containing it, by limiting the effects of the tiredness on the threads. The present thread connection improves the life time of a disposable filter cartridge. This allows to limit the maintenance operations.

The thread of the present invention is made in such a way to increase the cohesion of the assembly in case a ripping out force is applied. In particular, the thread of the present invention increases the cohesion force of the assembly only during the application of a ripping out force. The thread of the present invention is designed to increase the cohesion force of the assembly as long as the ripping out force is increasing. In other words, the cohesion force is increased proportionally to the increase of the ripping out force. The ripping out force may be a pressure internal to the cartridge or the bowl containing the cartridge. However, any external force which tends to dissociate the threaded parts of the assembly is considered as a ripping out force.

The threaded assembly according to the present invention comprises a first and a second part, also considered as a male part, and a female part, which is complementary to the male part. The female part of the assembly may correspond to the threaded part of the cartridge or the bowl containing the cartridge. The male part of the assembly may correspond to the threaded part of the base on which the cartridge is screwed. However, the opposite configuration, wherein the male part of the thread assembly is located on the cartridge or the bowl comprising the cartridge, and the female part of the thread assembly is located on the base, is also possible. In any of these configurations, the load flank of the threads has a reversed angle. This means that the threaded part of the cartridge is oriented rearward to the screwing axis of the cartridge. In case of a bowl, the threaded part of the bowl is oriented rearward to the screwing axis of the bowl. The screwing axis is to be understood as the axial direction to which the cartridge or the bowl containing the cartridge is screwed on the base, from an open position to a fully tightened position against the base. The load flank of the thread is the flank that takes the applied axial load in the threaded assembly. In case of an air-drier cartridge, the load flank is the part of the thread on which the internal air pressure is applied. Due to the reverse inclination of the threaded part of the cartridge, the air pressure applied to the cartridge improves the interaction between the base and the cartridge. In other words, the surface of contact between the male part and the female part of the threaded assembly tends to increase when an internal pressure is applied, thus allowing a stronger tightening of the cartridge onto the base. The surface of contact corresponds to the surface of the load flank of the first part of the threaded connection, which is in direct contact with the corresponding load flank of the second part of the threaded connection. In addition, the surface of contact may include the surface of the crest of the first part of the threaded connection which is in direct contact with the root of the second part of the threaded connection. The surface of contact increases when the clearance between the two parts of the threaded connection decreases, and in particular the clearance between the crest of the first part of the threaded connection and the root of the second part of the threaded connection.

Due to the reverse angle of the load flank, an increase of the internal pressure or any other ripping out force applied to the cartridge, tends to bring closer the crest of the first part and the root of the second part of the threaded connection. Under such conditions the clearance between the two parts of the threaded connection is minimized.

In practice, the thread of the present invention allows to bring closer the two parts of the threaded connections when a ripping out force is applied to the cartridge.

Therefore, the present invention is directed to a threaded assembly wherein the load flank has a reversed angle. The preferred assembly is an assembly of an air-drier filter cartridge, or a bowl containing an air-drier filter cartridge, and the base on which it is screwed. However, any threaded assembly which needs to resist against ripping out constraints are also encompassed. The present invention is further directed to a cartridge comprising a threaded portion, whereby the load flank is inclined rearward to the screwing axis of the cartridge. The cartridge is preferably a disposable cartridge, and more preferably an air-drier filter cartridge.

The invention also encompasses a vehicle equipped with the cartridge above mentioned, and the assembly of said cartridge with the corresponding base. The vehicle is preferably a medium or heavy duty vehicle like a truck, a bus, or any other industrial vehicle.

DETAILED DESCRIPTION

Figure 1:
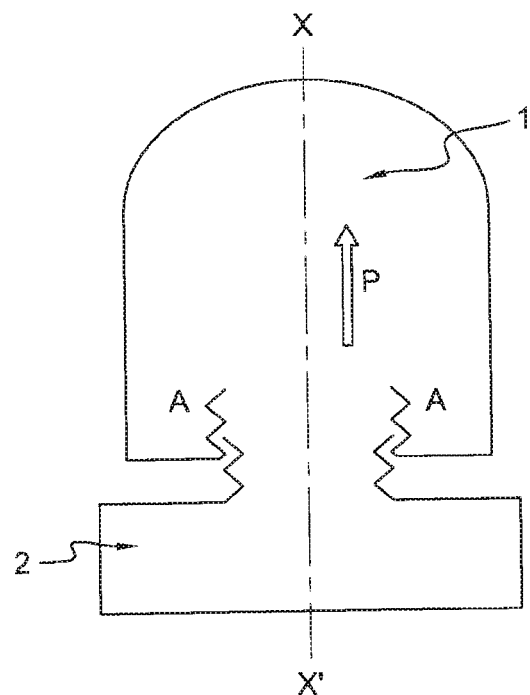
FIG. 1: view of a filter 1 screwed on the basis 2
Figure 2:
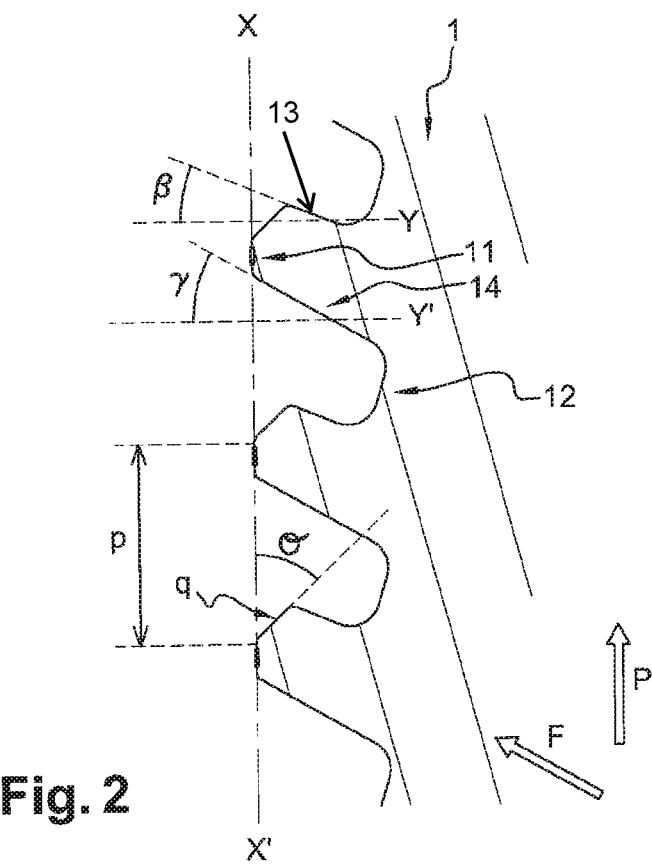
FIG. 2: Cross section of the threaded part A of the device 1

The present invention is directed to a device 1, adapted to be connected to a base 2, by the means of a threaded portion A. The threaded device 1 is for example a disposable filter or a bowl comprising a disposable filter. The profile of the threaded portion A of the device 1 comprises a crest 11, a root 12, a load flank 13, and a stab flank 14, which are organized helicoidally from one end to the other end of the threaded portion A, according to a pitch p. The device 1 is screwed on the base 2 following the screwing axis X-X'. The load flank 13 is oriented rearward compared to the screwing direction X-X', in such a way that when a pressure P, or any other ripping out force, is applied to the device 1, then a force F is oriented inwardly, and increases the cohesion between the device 1 and the base 2. The rearward orientation of the load flank 13 is defined by an acute angle with an axis parallel to the screwing axis X-X' passing through the root 12. The angle between the load flank 13 and the adjacent root 12 may be comprised between 45° and 90°, more preferably between 60° and 80°. The rearward orientation of the load flank is also characterized by an angle β with an axis Y orthogonal to the screwing axis X-X'. The angle β may be comprised between around 15° and around 45°. The angle β is advantageously comprised between around 20° and around 45°. The angle β is preferably comprised between 25° and 35°.

The stab flank 14 is also oriented rearward to the screwing direction X-X', in such a way that it forms an obtuse angle with the adjacent root 12, or with an axis parallel to the screwing axis X-X' passing through the root 12. The angle between the stab flank 14 and the adjacent root 12 is preferably comprised between 95° and 160°, more preferably between 100° and 120°. The orientation of the crest 11 is also characterized by the fact that the stab flank 14 forms an angle γ with an axis Y' orthogonal to the screwing axis X-X'. The angle γ may be comprised between around 15° and around 50°. It is advantageously comprised between around 20° and around 45°. The angle γ is preferably comprised between around 25° and 40°.

The load flank 13 and the stab flank 14 may be parallel to each other, meaning that the angles β and γ are identical. It can be advantageous that γ is greater than β, in such a way that the thickness of the crest 11 is decreasing from its base to its external end. Such a thicker base provides more resistance to the thread. In a preferred aspect, γ is 10% to 20% greater than β.

The extremity of the crest 11 may be rounded. Advantageously, the crest 11 is beveled, in such a way that its extremity is provided with a flat portion q. The flat portion q allows a clearance between the crest 11 of the threaded portion A of the device 1 and the root 22 of the threaded part of the base 2. The advantage is that no resistance is provided in this part of the thread when screwing or unscrewing the device 1. The further advantage is that in case the pressure P, or any other ripping out force, is strong enough to stress the thread, there is enough space to allow the crest 11 moving toward the root 22 of the thread of the base 2. Thus, the surface of contact between the load flank 13 and the load flank 23 of the base 2 is increased and the strength of the assembly is reinforced. The flat portion q forms an angle θ with the screwing axis X-X' comprised between around 5° and around 30°. The angle θ is preferably comprised between around 10° and around 20°. The flat portion q may extend from the load flank 13 until the stab flank 14 or from the load flank 13 until an intermediate position on the crest 11, thus providing an angular shape of the crest 11. The flat portion g preferably extends from the load flank 13 until around the middle of the crest 11.

Figure 3:
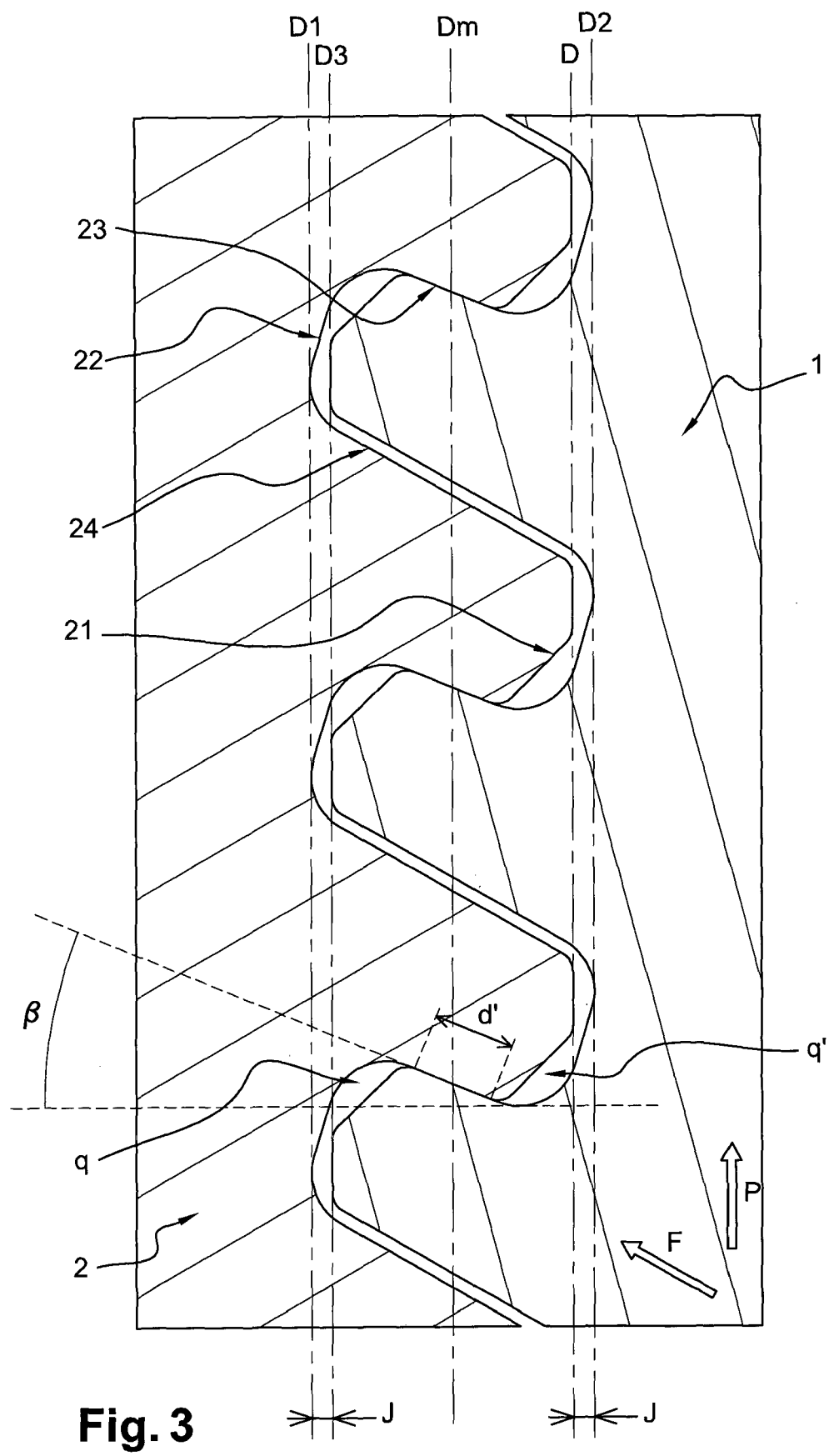
FIG. 3: Cross section of the assembly of the device 1 and the base 2.

The thread of the base 2 is complementary to the thread of the device 1, in such a way that the device 1 can be screwed on the base 2, and form an assembly, as shown in FIG. 3. In particular, the profile of the threaded portion of the base 2 comprises a crest 21, a root 22, a load flank 23 and a stab flank 24. The crest 21 may be provided with a flat portion q', wherein q' can make an angle with the screwing axis X-X', or any other parallel axis, comprised between around 5° and around 30°, preferably between around 10° and around 20°. The flat portion q' may extend from the load flank 23 to the stab flank 24, or from the load flank 23 to an intermediate position on the crest 21. The flat portion q' preferably extends from the load flank 23 until around the middle of the crest 21

In the assembly, the threaded part of the base 2 has an external diameter D, determined on the external extremity of the crest 21, and an internal diameter D1, determined in the fund of the root 22. D1 is defined according to the following rule:

$$D1=D-X*p,$$

Wherein

D is the external diameter of the threaded part of the base 2, determined on the extremity of the crest 21, D1 is the internal diameter of the threaded part of the base 2, determined in the fluid of the root 22, X is a variable comprised between 1 and 2, preferably between 1.2 and 1.8, and more preferably between 1.3 and 1.5, and P denotes the pitch of the thread.

D may be comprised between around 20 mm and around 500 mm, depending of the size and/or the shape of the filtering device. It is preferably comprised between around 30 mm and around 50 mm. It is more preferably comprised between around 35 mm and around 45 mm.

In the assembly, the threaded portion A of the device 1 has an internal diameter D2, determined in the fund of the root 12, and an external diameter D3, determined at the extremity of the crest 11. D3 is defined according to the following rule:

$$D3=D2-X*p,$$

Wherein

D3 denotes the external diameter of the threaded portion A, determined at the extremity of the crest 11, D2 denotes the internal diameter of the threaded portion A of the device 1, determined at the fund of the root 12, X denotes a variable comprised between 1 and 2, preferably between 1.2 and 1.8, and more preferably between 1.3 and 1.5, and p denotes the pitch of the thread, and wherein D2=D+J where J denotes the clearance between the device 1 and the base.

The assembly is maintained by the means of a contact area between the load flank 13 of the device 1 and the load flank 23 of the base 2. It has to be noted that in the assembly, the flat portion q of the crest 11 and the flat portion q' of the crest 21, may increase or reduce the contact area between the device 1 and the base 2, depending on the angle θ and/or the extent of the flat portions q and q' across the corresponding crests 11 and 21. The flat portions q and q' are therefore determined in such a way that the contact area between the device 1 and the base 2 is at least a line of contact. Preferably, q and q' are symmetrical, meaning that the contact area is at least a line corresponding to the medium diameter Dm, wherein $$Dm = \frac{D + D3}{2}$$

The contact area between the load flank 13 and the load flank 23 may be broadened around Dm, to a distance d' corresponding to the distance between the 2 flat portions q and q'. The maximal value of the distance d' is $$\frac{D - D3}{2} \cos \beta.$$

The distance d' may vary according to the pressure P, which is applied to the assembly. Due to the angle β, at least a part of the force F is directed inwardly and allows to increase the distance d', thus increasing the contact area between the device 1 and the base 2.

The invention claimed is:

1. A threaded device comprising a crest, a root, a load flank, a stab flank, and a pitch, wherein the crest is oriented rearward compared to a screwing axis, the load flank defining an acute angle with an axis parallel to the screwing axis passing through the root, and wherein the load flank makes an angle β with an axis Y orthogonal to the screwing axis,
wherein the angle β is comprised between 15° and 45° and the crest is beveled, in such a way that its extremity is provided with a flat portion.

2. The threaded device according to claim 1, wherein the stab flank makes an angle γ with an axis orthogonal to the screwing axis, wherein γ is comprised between 20° and 50° and wherein γ is greater than β.

3. The threaded device according to claim 1, wherein the crest is provided with a flat portion which makes an angle θ with the screwing axis, or an axis parallel to the screwing axis, wherein θ is comprised between 0° and 30°.

4. The threaded device according to claim 1, wherein the threaded device is either a filter or a housing comprising a filter.

5. The threaded device according to claim 4, wherein the filter is an air-dryer filter cartridge.

6. A vehicle equipped with the threaded device as in claim 1.

7. A threaded assembly comprising:
a threaded device, comprising a crest, a root, a load flank, and a stab flank, wherein the crest of the threaded device is oriented rearward compared to a screwing axis, having an internal diameter D2 and an external diameter D3,
a threaded base, comprising a crest, a root, a stab flank, and a load flank, wherein the crest of the threaded base is oriented toward the screwing direction of the threaded device, and having an internal diameter D1 and an external diameter D,
wherein D1=D−X * p, D3=D2−X * p, and D2=D+J
where X denotes a variable comprised between 1 and 2, p denotes a pitch of a thread of the threaded base, and J denotes a clearance between the threaded device and the threaded base,
wherein at least the crest of the threaded device is beveled, in such a way that its extremity is provided with a flat portion.

8. The threaded assembly according to claim 7, wherein the load flank of the threaded device and the load flank of the threaded base each forms an angle β with an axis orthogonal to the screwing axis, and wherein β is comprised between 1520 and 45°.

9. The threaded assembly according to claim 7, wherein the stab flank of the threaded device and the stab flank of the threaded base each forms an angle γ with an axis orthogonal to the screwing axis, and wherein γ is comprised between 15° and 50°.

10. The threaded assembly according to claim 7, wherein γ is greater than β.

11. The threaded assembly according to claim 7, wherein a contact area between the load flank of the threaded device and the load flank of the threaded base is at least a line corresponding to a medium diameter Dm, wherein $$Dm = \frac{D + D3}{2}.$$

12. The threaded assembly according to claim 7, wherein a contact area between the load flank of the threaded device and the load flank of the threaded base extends on a distance d' abroad a medium diameter Dm, wherein $$d' \leq \frac{D - D3}{2} \cos \beta.$$

13. The threaded assembly according to claim 7, wherein the threaded device is a filter or a housing comprising a filter.

14. The threaded assembly according to claim 13, wherein the filter is an air filter cartridge.

15. A vehicle equipped with the threaded assembly as in claim 7.

16. The threaded assembly according to claim 7, wherein the load flank of the threaded device defines an acute angle with an axis parallel to the screwing axis passing through the root of the threaded device, and wherein the crest of the threaded device has the internal diameter D2 and the external diameter D3.

* * * * *